United States Patent
Pandit et al.

(10) Patent No.: US 8,989,180 B2
(45) Date of Patent: *Mar. 24, 2015

(54) ROCE PACKET SEQUENCE ACCELERATION

(71) Applicant: Emulex Corporation, Costa Mesa, CA (US)

(72) Inventors: Parav Pandit, Costa Mesa, CA (US); Masoodur Rahman, Costa Mesa, CA (US); Kenny Meng-Hung Wu, Costa Mesa, CA (US); Chaitanya Tumuluri, Costa Mesa, CA (US)

(73) Assignee: Emulex Corporation, Costa Mesa, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/206,640

(22) Filed: Mar. 12, 2014

(65) Prior Publication Data

US 2014/0195631 A1    Jul. 10, 2014

Related U.S. Application Data

(63) Continuation of application No. 13/103,884, filed on May 9, 2011, now Pat. No. 8,705,572.

(51) Int. Cl.
| | |
|---|---|
| *H04L 12/28* | (2006.01) |
| *G06F 15/173* | (2006.01) |
| *G06F 13/28* | (2006.01) |
| *H04L 12/24* | (2006.01) |

(52) U.S. Cl.
CPC .......... *G06F 15/17331* (2013.01); *G06F 13/28* (2013.01); *H04L 41/06* (2013.01)
USPC .......................... 370/389; 370/419; 409/220

(58) Field of Classification Search
USPC ................. 370/419, 463, 389–390, 428–429; 719/314; 709/212–220
See application file for complete search history.

(56) References Cited

U.S. PATENT DOCUMENTS

| | | | | |
|---|---|---|---|---|
| 6,799,220 | B1* | 9/2004 | Merritt et al. ................. | 709/238 |
| 7,245,627 | B2 | 7/2007 | Goldenberg et al. | |
| 7,895,601 | B2* | 2/2011 | Benner et al. ................. | 719/314 |
| 2011/0119673 | A1* | 5/2011 | Bloch et al. .................. | 718/102 |

* cited by examiner

*Primary Examiner* — Iqbal Zaidi
(74) *Attorney, Agent, or Firm* — McAndrews, Held & Malloy Ltd.

(57) ABSTRACT

A method, network device and system for remote direct memory access (RDMA) over Converged Ethernet (RoCE) packet sequence acceleration are disclosed. The network device comprises one or more functionality components for communicating with a host system. The host system is configured for implementing a first set of functionalities of a network communication protocol, such as RoCE. The one or more functionality components are also operable to implement a second set of functionalities of the network communication protocol.

16 Claims, 8 Drawing Sheets

RoCE Packet Sequence Acceleration Algorithm

Figure 1: Remote Direct Memory Access (RDMA)
-- Prior Art --

Figure 2: RDMA Implementation with Full RoCE Offload

Figure 3: RDMA Implementation with Software RoCE Stack

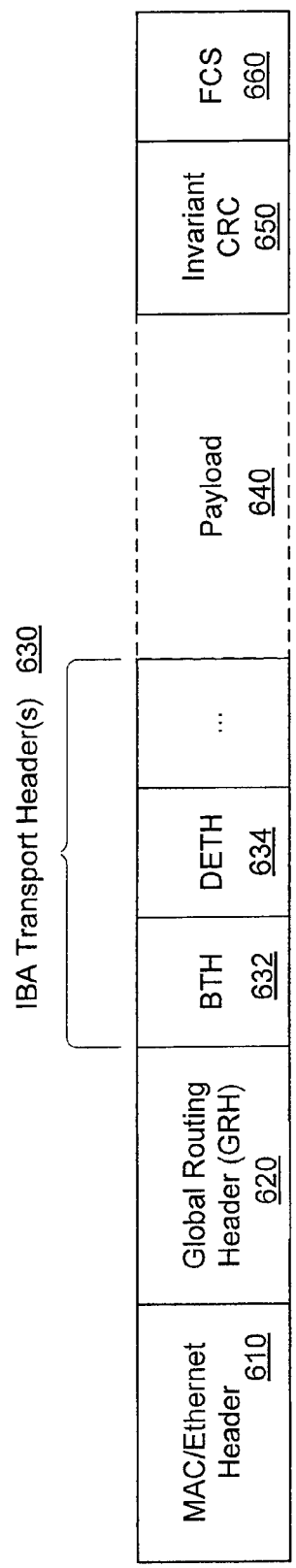
Figure 6: RoCE Packet Format

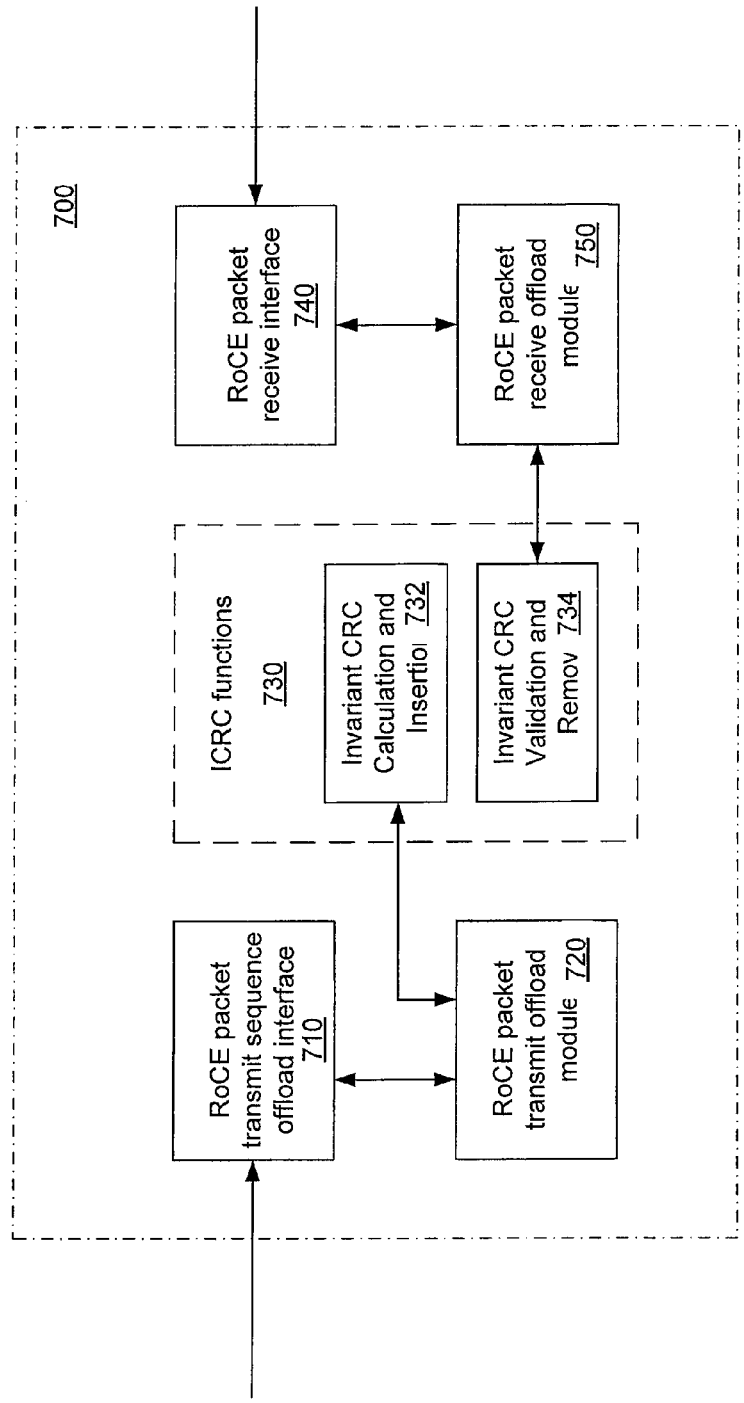
Figure 7: RoCE Packet Sequence Acceleration enabled Adapter

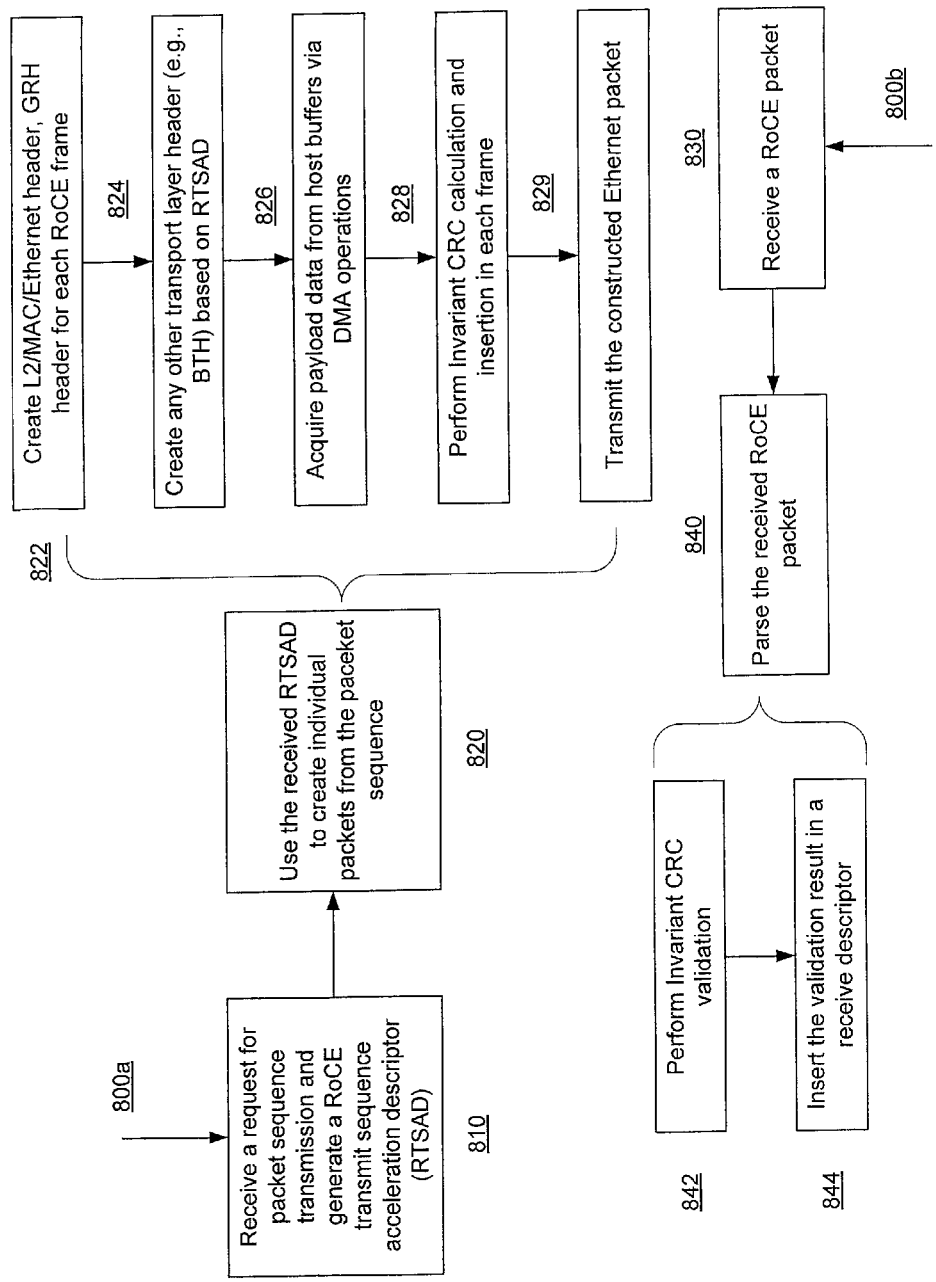
Figure 8: RoCE Packet Sequence Acceleration Algorithm

ROCE PACKET SEQUENCE ACCELERATION

CROSS REFERENCE TO RELATED APPLICATIONS

This is a continuation of U.S. patent application Ser. No. 13/103,884, filed May 9, 2011. The above-referenced United States patent application is hereby incorporated by reference in their entirety.

FIELD OF THE INVENTION

This generally relates to computer networking and communications, and more particularly, to enhanced data communications over computer networks by accelerating packet sequence transmitted and received under the RoCE (Remote Direct Memory Access (RDMA) over Converged Ethernet) protocol.

BACKGROUND OF THE INVENTION

One classic development in computing systems is direct memory access (DMA), in which a device can access the main memory directly while the CPU is free to perform other tasks. In a network with remote direct memory access (RDMA), for example, the network 110 as shown in FIG. 1, the data transfer between the two computers or devices 100a and 100b can be achieved in the following process: the sending host channel adapter (HCA) 106a uses DMA to read data in a user-specified buffer in the main memory 104a and transmits the data as a self-contained message across the network 110; then the receiving HCA 106b uses DMA to place the data into another user-specified buffer of the main memory 104b. Throughout this process, there is no intermediary copying and all of these actions occur without involvement of the CPUs 102a and 102b, which has an added benefit of lower CPU utilization. As demonstrated in FIG. 1, RDMA supports zero-copy networking by enabling the network adapter to transfer data directly to or from application memory, thereby eliminating the need to copy data between the application memory and data buffers in the operating system or any work to be done by CPUs, caches, or context switches. In other words, RDMA allows data transfers to continue in parallel with other system operations and thus reduces latency in message transfers across the network.

However, the acceptance of RDMA is currently limited by the need to install a different networking infrastructure. To solve this problem, new standards have been developed to enable RDMA implementation by utilizing the Ethernet at the physical layer and existing protocols such as TCP/IP for transport purposes. As a result, the performance and latency advantages of RDMA can be combined with a low-cost, standards-based solution.

Among these standards, one protocol is called Internet Wide Area RDMA Protocol (iWARP), which essentially implements RDMA over TCP/IP. The iWARP protocol is typically implemented in hardware RDMA NICs because a kernel implementation of the TCP stack is seen as a bottleneck. Furthermore, the handling of iWARP specific protocol details is often isolated from the TCP implementation to allow the NIC to be used for both as RDMA offload and TCP offload, and the portion of the hardware implementation used for implementing the TCP protocol is known as the TCP Offload Engine (TOE). Another standard that enables RDMA implementations over the Ethernet is RDMA over Converged Ethernet (RoCE). This protocol essentially implements RDMA over the InfiniBand® Architecture (IBA) by utilizing the transport services defined in the InfiniBand® Architecture Specification (e.g., InfiniBand® Architecture Specification Volume 1, Release 1.2.1 and Supplement to InfiniBand® Architecture Specification Volume 1, Release 1.2.1—RoCE Annex A16), including Reliable Connected (RC) service, Reliable Datagram (RD) service, Unreliable Connected (UC) service, Unreliable Datagram (UD) service and Extended Reliable Connected (XRC) service.

In comparison, the above two RDMA implementations, one with RoCE and the other with iWARP, both operate on top of reliable transport services, IBA and TCP, respectively, although each protocol may define different packet formats, headers, verbs, etc. For example, the entire RDMA iWARP header consists of Ethernet Header, IP/TCP and MPA/DDP/RDMAP, while the RoCE header consists of Ethernet Header, Global Routing Header (GRH) and IBA transport headers. Particularly, the IBA transport headers include a Base Transport Header (BTH) that contains a Packet Sequence Number (PSN), which is usually used by reliable transport services in request and respond directions to determine packet delivery order, duplicate packets and out-of-sequence/missing packets from being processed. Different from TCP, IBA does not support selective packet retransmission or the out-of-order reception of packets. In addition, IBA provides a packet boundary on MTU size for a given connection. This simplifies packet retransmission and reception handling in the transport level, which renders RoCE a more hardware-friendly solution. A need also arises to further improve RoCE implementations in hardware, e.g., a network adapter, for accelerating RoCE packet sequence transmission and reception.

SUMMARY OF THE INVENTION

Embodiments of the present invention relate to methods and apparatus for accelerating RoCE packet sequence transmission to ensure efficient data transfer and network communications over semi-reliable networks, such as the converged Ethernet. In one embodiment, provided is a method of accelerating transmission of a packet sequence over a network having Remote Direct Memory Access (RDMA) capabilities or within a host in a loopback mode, which comprises implementing a partial offload of one or more functionalities defined by a network communication protocol in a software module in a host system, the host system including at least one software stack configured for processing packets in accordance with the network communication protocol; and configuring a network adapter coupled to the host system to support the partial offload of the functions, the network adapter receiving a request for transmitting a packet sequence from the host system, generating a transmit descriptor based on the request and using information in the transmit descriptor to create individual packets from the packet sequence, each packet having a format defined by the network communication protocol.

Another embodiment is a system of accelerating transmission of a packet sequence over a network having Remote Direct Memory Access (RDMA) capabilities or within a host in a loopback mode. Such a system comprises a host software stack comprising a module implementing a partial offload of one or more functionalities defined by a network communication protocol; and an adapter coupled to the host software stack and configured to support the partial offload, the adapter comprising a transmit interface configured to receive a request for transmitting a packet sequence from the host software stack and generate a transmit descriptor based on the request, the transmit descriptor including information for creating individual packets from the packet sequence, each packet having a format defined by the network communication protocol.

Yet another embodiment is a network adapter comprising a transmit interface configured to receive a request for transmitting a packet sequence from a host to a network or within the host in a loopback mode in accordance with a network communication protocol, the transmit interface further configured to generate a transmit descriptor based on the request, the transmit descriptor including information for creating individual packets from the packet sequence, each packet having a format defined by the network communication protocol. The network adapter may further comprise a transmit offload module configured for creating the individual packets from the packet sequence based on the information in the transmit descriptor, a packet receive interface configured for receiving a packet from the network and a packet receive offload module configured for parsing the packet in accordance with the network communication protocol, the packet receive offload module further configured for performing an Invariant CRC validation and insertion in a receive descriptor, the receive descriptor transmitted to the host to avoid additional Invariant CRC validation in the host.

An alternative embodiment provides a computer-readable storage medium comprising computer-executable instructions, which, when executed, causing a processor to perform the steps of receiving a request for transmitting a packet sequence from a host system to a network or within the host system in a loopback mode in accordance with a network communication protocol; and generating a transmit descriptor based on the request, the transmit descriptor including information for creating individual packets from the packet sequence, each packet having a format defined by the network communication protocol. Also provided is a computer-readable storage medium comprising computer-executable instructions, which, when executed, causing a processor to perform the steps of receiving a packet from a network; parsing the packet in accordance with a network communication protocol to extract fields for performing an Invariant CRC validation; and performing the Invariant CRC validation based on the extracted fields and inserting the Invariant CRC validation result into a receive descriptor.

BRIEF DESCRIPTION OF THE DRAWINGS

FIG. 6 illustrates an exemplary RoCE packet format according to various embodiments of the present invention;

FIG. 7 is a block diagram showing an exemplary network adapter enabling RoCE packet sequence acceleration according to various embodiments of the present invention;

FIG. 8 is a flow diagram showing an exemplary algorithm for RoCE packet sequence acceleration in both transmission and reception directions according to various embodiments of the invention.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the present invention relate to implementing Remote Direct Memory Access (RDMA) over Converged Ethernet (RoCE). Particularly, methods and apparatus are described herein for accelerating RoCE packet sequence transmission and reducing processing latency in received RoCE packets. In one embodiment, the RoCE protocol stack and RDMA verbs are implemented partially in the host software and partially in the adapter hardware, thereby providing an improved balance between simplifying the adapter configuration and maximizing the host processing efficiency. Furthermore, the adapter implemented with partial RoCE offload is able to perform a few major functionalities under the RoCE protocol, such as offloading a complete RoCE packet sequence for transmission, building individual packets out of the RoCE packet sequence, performing Invariant CRC calculation, insertion, validation and removal thereof, and so forth.

Although embodiments of the invention may be described and illustrated herein in terms of implementing RDMA over the Converged Ethernet (RoCE) based on InfiniBand® Architecture (IBA), it should be understood that embodiments of this invention are not so limited, but may additionally be applied in the context of many other protocols that enables reliable transport over semi-reliable local networks, such as converged Ethernet. In addition, embodiments of the invention may be described and illustrated herein using specific mechanisms, terms and definitions, such as RoCE transmit sequence acceleration descriptor (RTSAD), Invariant CRC, converged network adapter (CNA) and so forth, but it should be understood that many other equivalent elements can be employed for the same or similar purposes without departing from the spirit of the invention.

Figure 1:
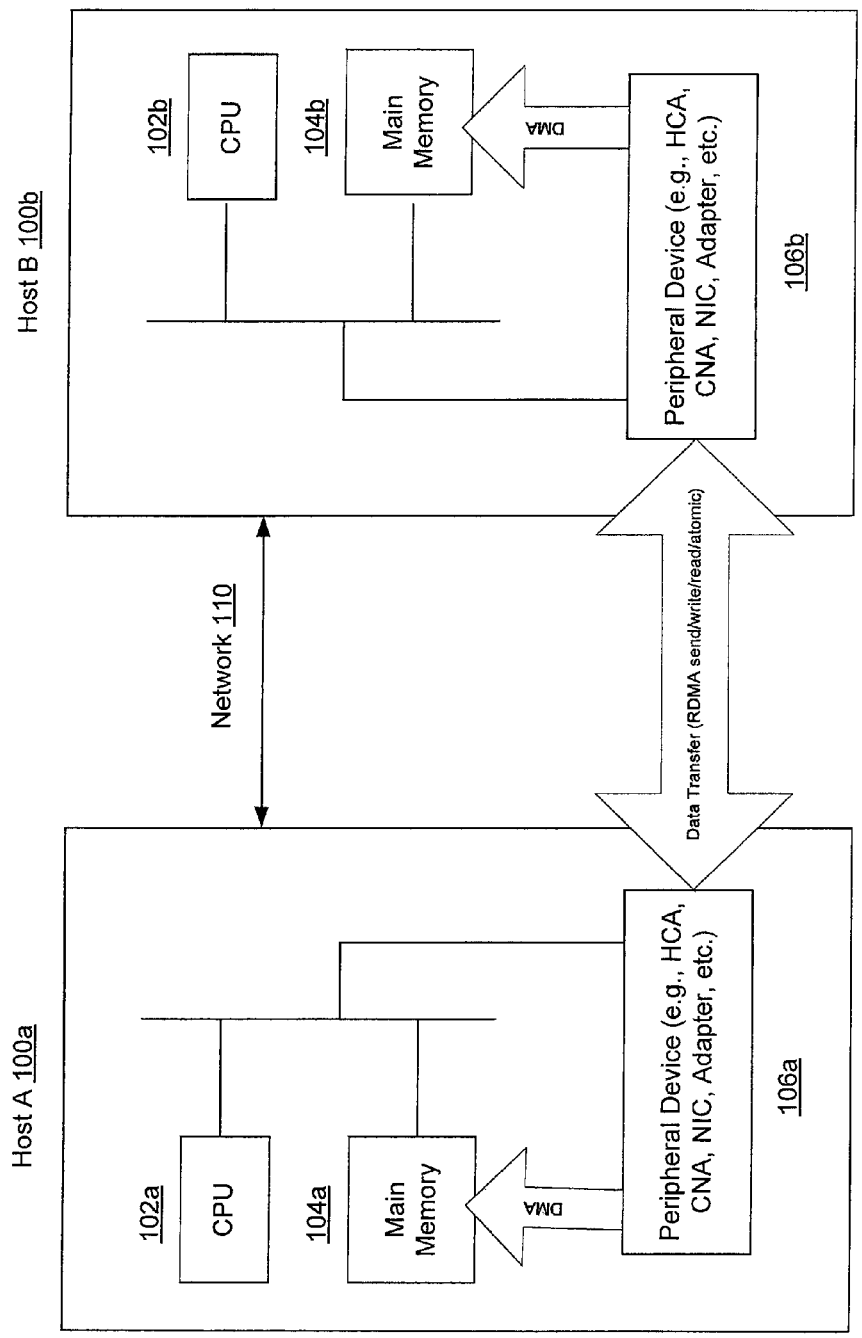
FIG. 1 is a block diagram illustrating the concept of Remote Direct Memory Access (RDMA) across a computer network.
Figure 2:
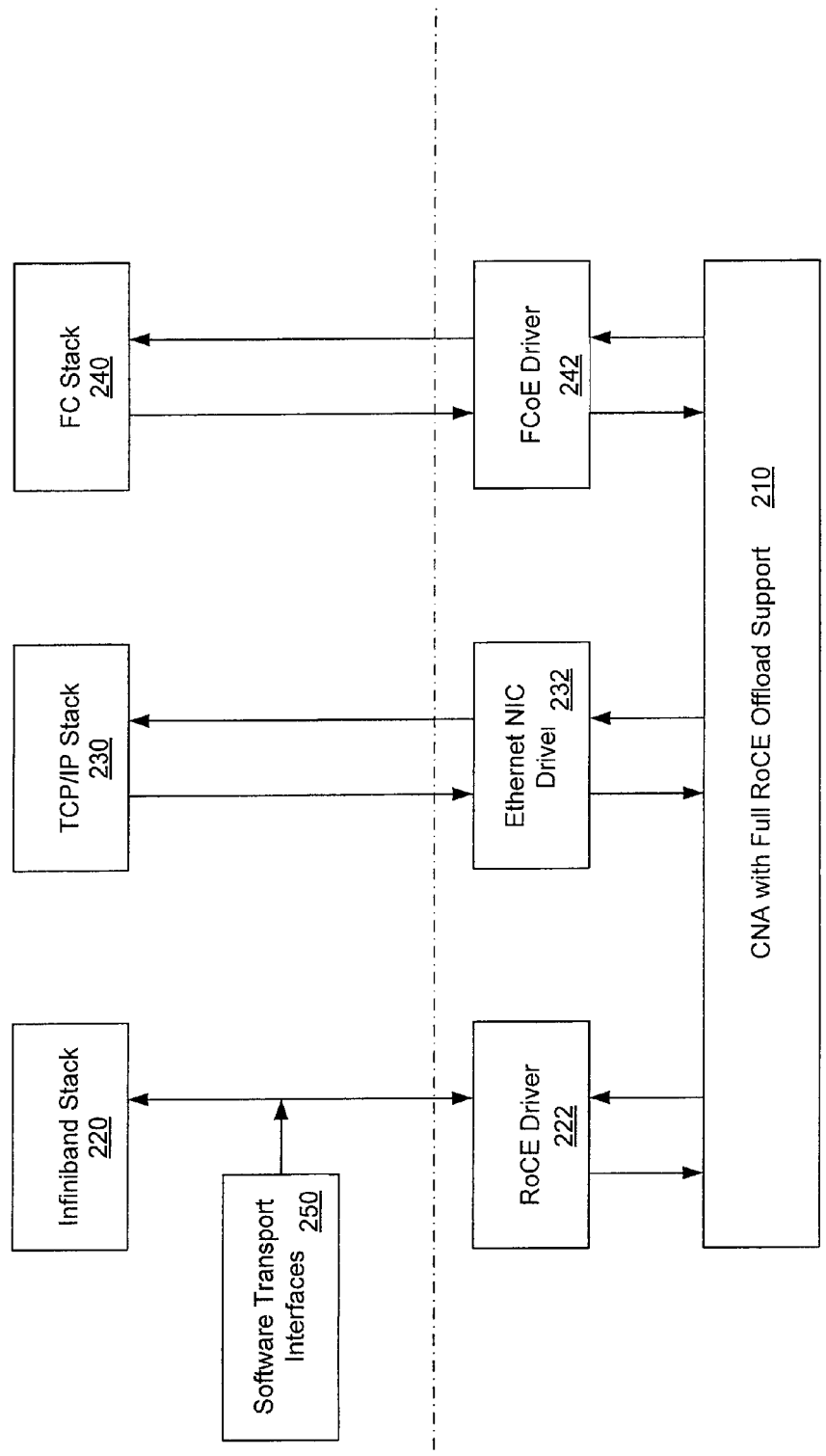
FIG. 2 is a block diagram presenting one exemplary RoCE implementation in a computer network.

The InfiniBand® Architecture (IBA) specification (e.g., InfiniBand® Architecture Specification Volume 1, Release 1.2.1 and Supplement to InfiniBand® Architecture Specification Volume 1, Release 1.2.1—RoCE Annex A16), particularly Chapters 10 and 11, defines a number of RDMA verbs required for implementing RDMA over Converged Ethernet. Typically, the RDMA verbs are implemented in software transport interfaces to support client applications. In addition, a RoCE protocol stack is often employed for handling different protocol layers, such as the transport, network, data link and physical layers. The RDMA verbs and RoCE protocol stack can be implemented in a host channel adapter (HCA) and/or a RoCE-enabled converged network adapter (CNA) in various ways. For example, FIG. 2 presents a hardware implementation of the RoCE protocol stack and software transport verbs. As shown in FIG. 2, such a network adapter (CNA) 210 is configured with full RoCE offload, which means, both the RoCE protocol stack and software transport verbs are implemented in the adapter hardware. In operation, the adapter 210 communicates with different protocol stacks through specific protocol drivers. Specifically, the adapter 210 communicates with the Infiniband stack 220 via a RoCE driver 222, the TCP/IP stack 230 via an Ethernet driver or NIC 232, the Fibre Channel (FC) stack 240 via a Fibre Channel over the Ethernet (FCoE) driver 242, and so on. Also, software transport interfaces 250 are implemented between the Infiniband stack 220 and RoCE driver 222 to support and facilitate their communications. Because the adapter 210 supports full RoCE offload and no implementations or modification is required in the host system, the implementation in FIG. 2 generally improves the overall efficiency in terms of data transfer as well as the CPU usage in the host. However, this method also increases the complexity and cost in making RoCE-enabled adapters.

Figure 3:
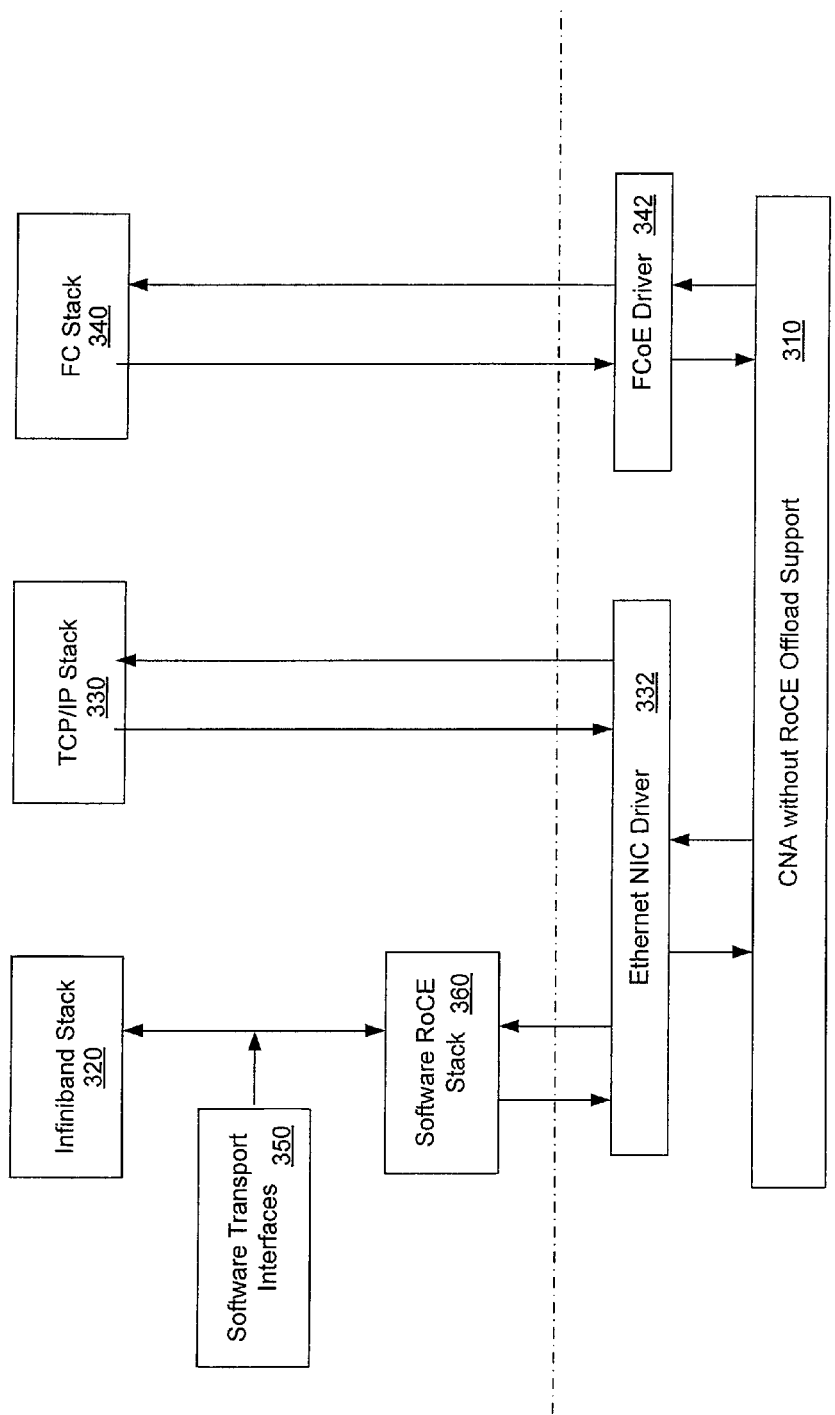
FIG. 3 is a block diagram presenting an alternative exemplary RoCE implementation in a computer network.

FIG. 3 shows an alternative method of implementing the RoCE protocol stack and RDMA verbs. Different from the above-described hardware implementation in the adapter, this method implements the RoCE protocol stack and RDMA verbs completely in host system software without any hardware intelligence. As shown in FIG. 3, a software RoCE stack 360 is provided to enable RDMA verbs as well as the transport services under the RoCE protocol. As a result, the adapter 310 is simplified with no need to support RoCE offload. Due to the software implementation, i.e., the software RoCE stack 360, in the host system, the adapter 310 no longer needs a specific RoCE driver to communicate with the Infiniband stack 320. Instead, the adapter 310 may use the Ethernet Driver or NIC 332 to communicate with both the Infiniband stack 320 and the TCP/IP stack 330. In operation, the software RoCE stack needs to perform a few tasks, including calculating Invariant CRC for each packet that involves reading consumer data from the host memory, building packets for each RDMA operation, and validating the Invariant CRC of each received RoCE packet by reading all required bytes in the header and payload portion of the received packet from the host memory. As can be seen above, using the method of FIG. 3, the adapter is simplified with lower building costs, but the overall performance is compromised when certain resources in the host system are devoted for implementing the RoCE protocol stack and RDMA verbs.

Figure 4:
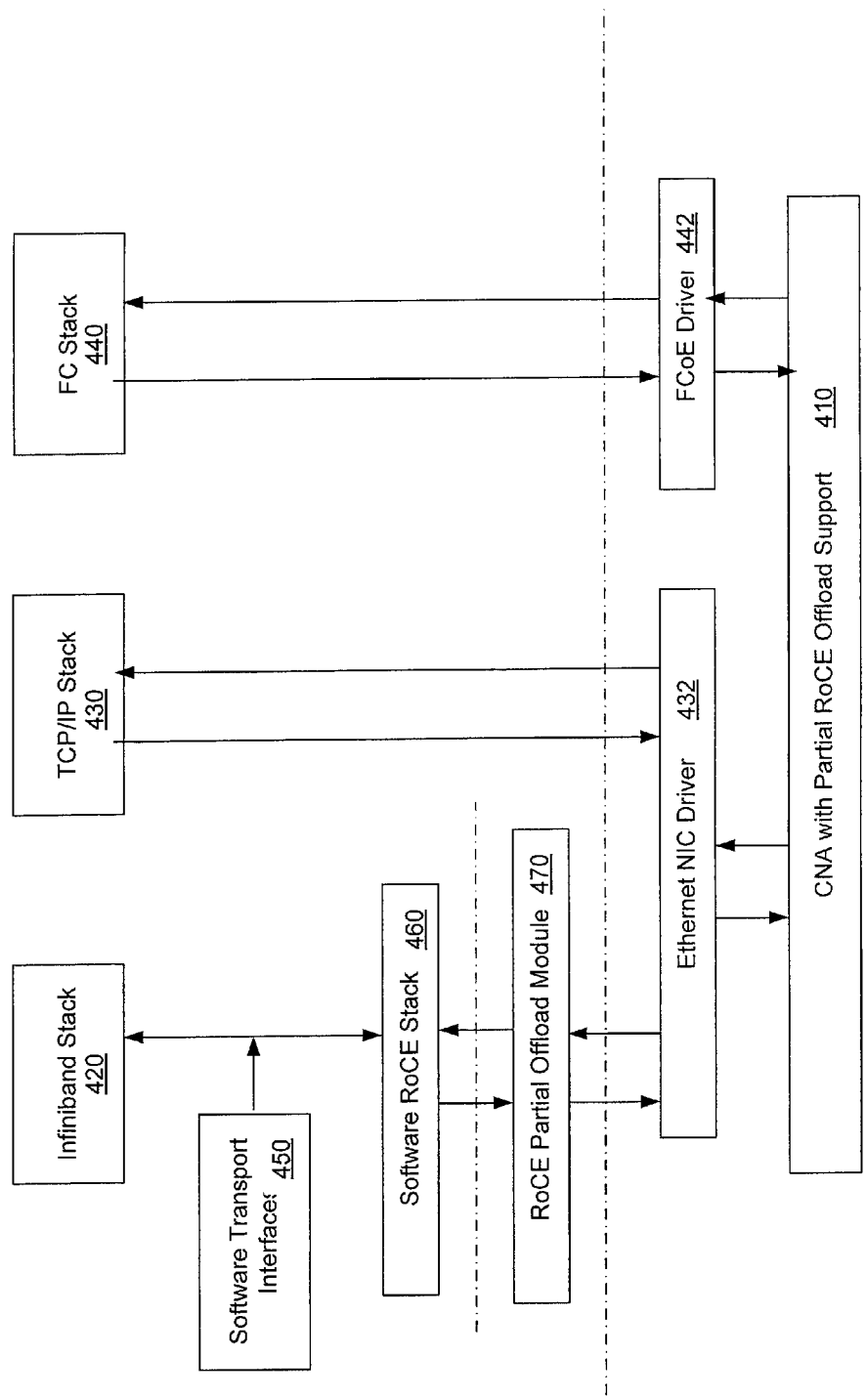
FIG. 4 is a block diagram presenting another exemplary RoCE implementation according to various embodiments of the present invention.
Figure 5:
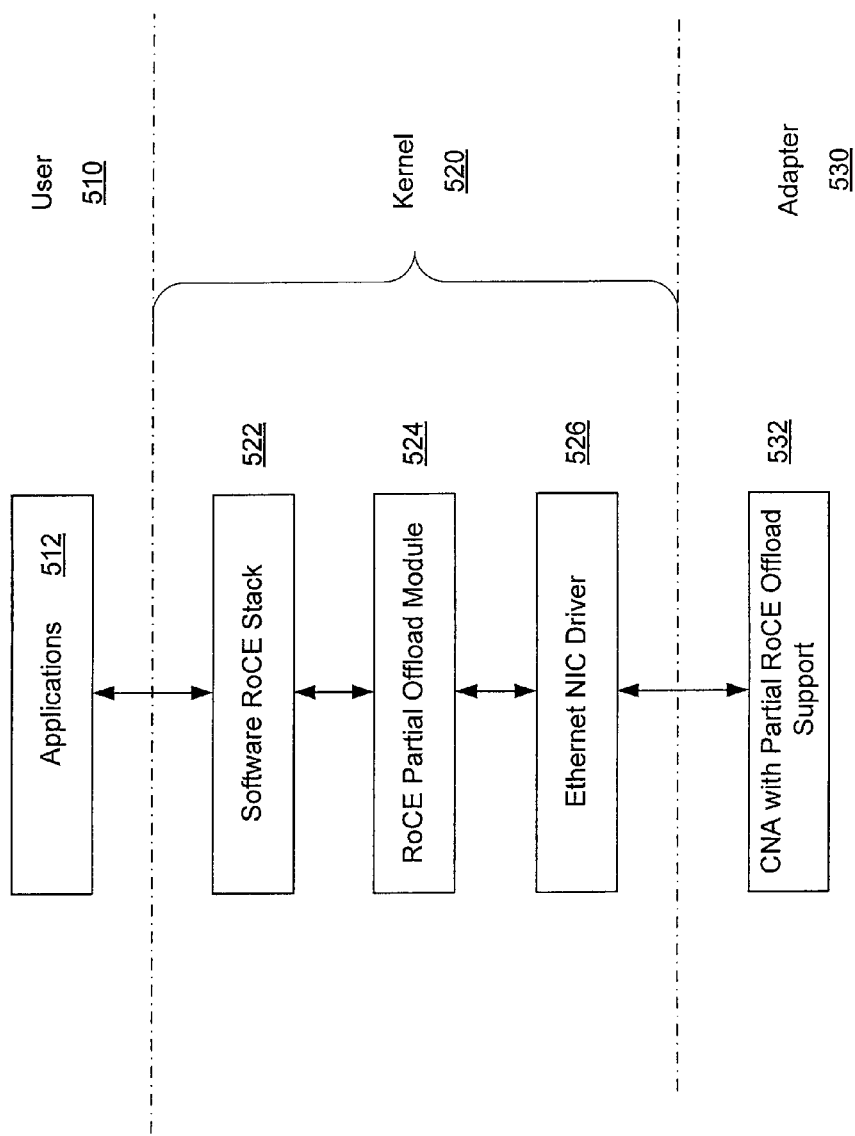
FIG. 5 is a block diagram providing an alternative view of the RoCE implementation of FIG. 4 according to various embodiments of the present invention.

Referring now to FIGS. 4-5, another possible RoCE implementation will be described, which combines certain features and functionalities of the above two methods to allow for not only flexible implementations of RoCE protocols in the host software and adapter hardware, but also accelerated RoCE packet sequence transmission and reception. As shown in FIG. 4, this RoCE implementation method configures the adapter 410 with partial RoCE offload, and on the host software side, introduces a RoCE partial offload module 470, which is coupled to the software RoCE stack 460 and configured to perform one or more of the above-discussed tasks in RDMA operations. The RoCE software stack 460 is configured for handling details of the RoCE protocol, such as error handling, re-transmission, memory operation validation and so forth. According to this configuration, the implementations of the RoCE protocols and RDMA verbs are better balanced between the host system and adapter.

FIG. 5 provides a different view of the above-described RoCE implementation in a computer system. The user layer 510 comprises various applications 512. A RoCE-enabled CNA 532 is implemented at the adapter or hardware layer 530. As aforementioned, this adapter 532 is configured with partial RoCE offload. That means, instead of a full offload of all RoCE functionalities, the adapter 532 is configured to perform a few major functionalities to support RoCE operations. As will be described in detail below with reference to FIG. 7, these functionalities include a RoCE packet transmit sequence offload interface, a RoCE packet transmit offload module, Invariant CRC calculation and insertion in transmitted RoCE packets and Invariant CRC validation and removal in received RoCE packets. Between the user layer 510 and the hardware layer 530 is the kernel 520, which includes without limitation a software RoCE stack 522, a RoCE partial offload module 524 and an Ethernet driver or NIC 526.

FIG. 6 is a block diagram showing an exemplary RoCE packet format according to the InfiniBand® Architecture (IBA) specification. As shown in FIG. 6, the RoCE header consists of an Ethernet Header 610, a Global Routing Header (GRH) 620, and one or more IBA transport headers 630. The Ethernet or MAC header 610 provides information about the packet source and destination to enable the underlying network, Ethernet in this case, to successfully switch the packet through the subnet such that it is delivered to the appropriate destination endpoint. The IBA transport header(s) 630 contains the information required for the endnode to complete the specified operation such as delivery of data payload to appropriate entity within the endnode host memory with SEND/RDMA Write operations, fetching data payload from the host memory with RDMA Read operation and returning the read data with RDMA Read Responses to the requester, Atomic Read/Compare/Modify/Add and Write back to the same 8 byte host memory location, and so on. Depending on the data transactions, the IBA transport header(s) 630 may include one or more sub-headers, such as a base transport header (BTH) 632, a Datagram Extended Transport Header (DETH) 634, etc.

The RoCE packet format in FIG. 6 also includes a payload 640, an Invariant CRC 650 and an FCS 660, which is essentially Ethernet CRC defined for Ethernet frames. Each RoCE packet requires an Invariant CRC before the Ethernet CRC. The Invariant CRC leverages the same generator polynomial as the Ethernet and FC CRC. The Invariant CRC (ICRC) is calculated as described in the IBA specification. Although IBA Local Routing Header (LRH) is not present in a RoCE packet, the ICRC calculation still includes 64 bits of 1 (0xffff_ffff_ffff_ffff) as described in the IBA specification. Specifically, all the variant fields (e.g., the Traffic Class/Flow Label/Hop Limit fields in GRH, the resv8A field in BTH) are replaced with bits of 1 before the Invariant CRC is calculated. Additionally, if a payload field exists in a RoCE packet, the payload should be padded by a number of bytes specified in the PadCnt field of BTH.

Table 1 below shows the various combinations in a RoCE packet format:

TABLE 1

| RoCE Packet Format | | | |
| --- | --- | --- | --- |
| Label | Size | Name | Notes |
| MAC | 14B+ | Ethernet Header | Present in all packets of message with RoCE EtherType 0x8915 |
| GRH | 40B | Global Routing Header | Present in all packets of message with NxtHdr 0x1B |
| BTH | 12B | Base Transport Header | Present in all packets of message |
| RDETH | 4B | Reliable Datagram Extended Transport Header | Present in every packet of reliable datagram message |

TABLE 1-continued

RoCE Packet Format

| Label | Size | Name | Notes |
| --- | --- | --- | --- |
| DETH | 8B | Datagram Extended Transport Header | Present in every packet of datagram request message |
| XRCETH | 4B | Extended Reliable Connected Extended Transport Header | Present in the XRC request packets |
| RETH | 16B | RDMA Extended Transport Header | Present in first packet of RDMA request message |
| AtomicETH | 28B | Atomic Extended Transport Header | Present in Atomic request message |
| AETH | 4B | ACK Extended Transport Header | Present in all ACK packets, including first and last packet of message for RDMA Read Response packets. |
| AtomicAckETH | 8B | Atomic ACK Extended Transport Header | Present in all AtomicACK packets |
| ImmDt | 4B | Immediate Data Extended Transport Header | Present in last packet of request with immediate data |
| IETH | 4B | Invalidate Extended Transport Header | Present in last packet of SEND with Invalidate request |
| PYLD | 0-4096B | Payload | RoCE Payload, including 0-3B pad. |
| ICRC | 4B | Invariant CRC | Present in all packets of message. Invariant CRC covers:<br>1. 0xffff_ffff_ffff_ffff<br>2. Replace variant fields with 1's in GRH: Traffic Class/Flow Label/Hop Limit<br>3. Replace variant field with 1's in BTH: resv8A.<br>4. Remaining Transport Headers and Payload/Pad. |
| FCS | 4B | Ethernet CRC | Present in all packets of message |

FIG. 7 is a block diagram showing an exemplary network adapter configured with partial RoCE offload to enable acceleration of RoCE packet sequence transmission and reception. This adapter 700 (aka, adapter 410 in FIG. 4 and adapter 532 in FIG. 5) is configured to include a few functionality components: RoCE packet transmit sequence offload interface 710, RoCE packet transmit offload module 720, Invariant CRC related functions 730, RoCE packet receive interface 740 and RoCE packet receive offload module 750.

The RoCE packet transmit sequence offload interface 710 is designed to allow the Ethernet driver or NIC to specify transmission of a complete packet sequence through a single request to the adapter. Without this interface, the software RoCE stack and the Ethernet driver would need to send multiple requests to the adapter for a packet sequence transmission, where each individual request specifies a single packet in the packet sequence. Accordingly, the RoCE packet transmit sequence offload interface 710 in the adapter avoids redundant request operations and significantly reduces the workload required of the CPU. When the interface 710 receives from the Ethernet driver or NIC a request specifying transmission of a complete packet sequence, a transmission descriptor, i.e., RoCE transmit sequence acceleration descriptor (RTSAD), is created based on the request. This descriptor typically carries a list of information items as in Table 2 below:

TABLE 2

RoCE transmit sequence acceleration descriptor (RTSAD)

L2 or Ethernet header information
GRH header information

TABLE 2-continued

IBA transport layer header(s) information
Total transmit size
Frame size
Start of packet sequence number (PSN)
Scatter gather (S/G) list of data buffers It should be appreciated that the specific design of such a transmission descriptor can vary in actual implementations, and the above-listed information in a RTSAD is for illustration purposes only.

Next the RoCE packet transmit sequence offload interface 710 sends the RTSAD to the RoCE packet transmit offload module 720 for building individual RoCE packets based on the packet sequence to be transmitted. In other words, the RoCE transmit offload module 720 uses the RTSAD to break the transmit packet sequence into individual RoCE packets. In this process, the RoCE transmit offload module 720 first creates L2 or Ethernet header and GRH header for each frame in the transmit sequence based on the template in the RTSAD. Then the RoCE transmit offload module 720 creates any other transport layer header for each frame in the sequence also based on the template in the RTSAD. For each newly-created RoCE packet, the PayLen field of GRH is modified based on the frame_size and remaining size of data to transfer, and the PSN field of BTH is also modified in accordance with the following equations:

(1) Current_PSN for the first packet in sequence=PSN given in RTSAD (2) Subsequent_PSN=(Current_PSN+1) modulo $2^{24}$ Table 3 below provides an exemplary process for making modifications to the template header in the RTSAD as each new packet is created:

TABLE 3

An exemplary process for making modifications to RTSAD a. BTH.SE is set in the LAST or ONLY packet of a SEND, SEND with Immediate, RDMA WRITE with Immediate or SEND with Invalidate.
b. ImmDt, if present, is inserted in the LAST or ONLY packet of a SEND or a RDMA WRITE. The BTH.opcode needs to be modified in the packet that carries the ImmDt.
    i. SEND Last with Immediate
    ii. SEND Only with Immediate
    iii. RDMA WRITE last with Immediate
    iv. RDMA WRITE only with Immediate.
c. RETH, if present, is inserted in the FIRST or ONLY or ONLY with Immediate packet of a RDMA WRITE. Adapter uses the information provided in the RETH to frame subsequent packets of a multi-packet RDMA WRITE.
d. AETH, if present, is inserted in the FIRST or ONLY or LAST of a RDMA READ response.
e. IETH, if present, is inserted in the LAST or ONLY of a SEND
f. Adapter sets the correct opcode for a multi packet sequence.
   FIRST—first packet of a multi packet sequence
   MIDDLE—middle packets of a multi packet sequence
   LAST—last packet of a multi-packet sequence
   ONLY—only packet of a multi-packet sequence.

After the headers are created for each packet in the sequence, the RoCE packet transmit offload module 720 performs DMA operations to obtain the payload data from host buffers specified by the scatter gather (S/G) list in RTSAD. The payload is padded with a number of bytes as specified in the PatCnt field of BTH before incurring the Invariant CRC calculation and insertion function 732. The RoCE packet transmit module 720 then performs the ICRC calculation and inserts it in each frame. This process repeats until the total transmit size as specified in RTSAD for the complete sequence is exhausted. Note that the Invariant CRC calculation and insertion function 732 can be performed independent of the above-described process for RoCE packet transmit offload.

In the packet receiving direction, the RoCE-enabled adapter 700 further includes a RoCE packet receive interface 740 and a RoCE packet receive offload module 750. When a RoCE packet from the network is received at the RoCE packet receive interface 740, the adapter 700 parses the packet and enables the RoCE packet receive offload module 750 to perform Invariant CRC validations. Specifically, the module 750 extracts from each packet the fields that contribute to the ICRC validation and couple them with additional dummy fields as defined in the InfiniBand® Architecture (IBA) specification and RoCE Annex thereto. The ICRC validation and its result are included in a receive descriptor to be communicated to the host software. In that regard, the host software does not need to perform the Invariant CRC, which further reduces processing latency associated with the received RoCE packets.

With the RoCE partial offload configuration in the adapter hardware as well as the host software, the RoCE packet sequence can be accelerated in both transmitting and receiving directions. The flow diagram in FIG. 8 shows a simplified algorithm for RoCE packet sequence acceleration, at least a portion or all of which can be implemented in the adapter as shown in FIGS. 4-5 and 7.

In the transmitting direction, the process 800a starts at step 810, where a request for RoCE packet sequence transmission is received at a RoCE-enabled adapter or a partially RoCE-enabled adapter, following which a RTSAD is created. As described above, the RTSAD includes a list of information items from header information to addresses of payload data in the host memory. In one embodiment, the RTSAD is created by the module 524 in FIG. 5, and transmitted to the adapter via a NIC driver. Typically, the NIC driver provides a regular transmit descriptor (TD). RTSAD provides an extension to the NIC TD with additional information. In step 820, the adapter uses the received RTSAD to create individual RoCE packets in the complete packet sequence for transmission. In one embodiment, the RoCE packet transmit offload module 720 in FIG. 7 receives the RTSAD and performs the processing thereof. This step can be further divided into a few sub-steps, including step 822 at which the Ethernet header and GRH are created for each RoCE frame based on the header information in the RTSAD, step 824 at which any other transport headers (e.g., BTH) are created for each RoCE frame based on the RTSAD, step 826 at which payload is acquired from host buffers as described by the S/C list through DMA operations and step 828 at which Invariant CRC is calculated and inserted in each RoCE frame. At step 829, the constructed individual packet (e.g., an Ethernet packet) is transmitted over the network. Or in a loopback mode, the packet may be transmitted back to the receiving path of the host, such as the RoCE packet receive interface 740 in FIG. 7.

In the receiving direction, the process 800b starts at step 830, where the adapter receives a RoCE packet from the network. Then, at step 840, the adapter parses the received RoCE packet. In parsing the received packet, the adapter performs necessary Invariant CRC validation at step 842 by extracting fields that contribute to the ICRC validation and adding dummy fields as defined in the InfiniBand® Architecture (IBA) specification and RoCE Annex thereto. At step 844, the ICRC validation and results are inserted in a receive descriptor to be communicated to the host software.

In practice, the methods, processes or steps described herein may constitute one or more programs made up of machine-executable or computer-executable instructions. The above description with reference to the flowcharts in FIGS. 5 and 6 enables one skilled in the art to develop such programs, including such instructions to carry out the operations represented by logical blocks on suitably-configured processors. The machine-executable instructions may be written in a computer programming language or may be embodied in firmware logic or in hardware circuitry including dynamically programmable or configurable hardware circuitry. If written in a programming language conforming to a recognized standard, such instructions can be executed on a variety of hardware platforms and for interface to a variety of operating systems. The present invention is not described with reference to any particular programming language, but it will be appreciated that a variety of programming languages may be used to implement the teachings of the invention as described herein. Furthermore, it is common in the art to speak of software, in one form or another (e.g., program, procedure, process, application, module, logic), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in the flow diagrams without departing from the scope of the invention and that no particular order is implied by the arrangement of blocks shown and described herein. In addition, one of ordinary skill in the art will recognize that the terms "computer-readable medium" or "machine readable medium" include memory space and any type of storage device accessible by a processor.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A network device comprising:
one or more functionality components operable to communicate with a host system, the host system being operable to implement a first set of functionalities of a network communication protocol, the one or more functionality components being operable to implement a second set of functionalities of the network communication protocol, the one or more functionality components comprising:
a transmit interface operable to receive, from the host system, a single request for transmitting a packet sequence, and operable to generate a transmit descriptor based on the request; and
a transmit offload module operable to receive the transmit descriptor from the transmit interface and operable to create individual packets from the packet sequence according to information in the transmit descriptor, wherein creating the individual packets is one functionality of the second set of functionalities of the network communication protocol.

2. The network device in claim 1, wherein the single request specifies transmission of a complete packet sequence such that the network device avoids redundant request operations.

3. The network device in claim 1, wherein the one or more functionality components comprise:
an offload module operable to perform an invariant cyclic redundancy check (CRC) function, wherein performing the invariant CRC function is one functionality of the second set of functionalities of the network communication protocol.

4. The network device in claim 3, wherein the one or more functionality components comprise the offload module.

5. The network device in claim 1, wherein the network communication protocol is a remote direct memory access (RDMA) over Converged Ethernet (RoCE) protocol.

6. The network device in claim 1, wherein the network device is a converged network adapter.

7. A system comprising:
a host system operable to implement a first set of functionalities of a network communication protocol; and
a network device operable to communicate with the host system, the network device being operable to implement a second set of functionalities of the network communication protocol, the network device comprising:
a transmit interface operable to receive, from the host system, a single request for transmitting a packet sequence and operable to generate a transmit descriptor based on the request; and
a transmit offload module operable to receive the transmit descriptor from the transmit interface and operable to create individual packets from the packet sequence based on information in the transmit descriptor, wherein creating the individual packets is one functionality of the second set of functionalities of the network communication protocol.

8. The system of claim 7, wherein the network device comprises:
an offload module operable to perform an invariant cyclic redundancy check (CRC) function, wherein performing the invariant CRC function is one functionality of the second set of functionalities of the network communication protocol.

9. A method comprising:
communicating, by a network device, with a host system, the host system being operable to implement a first set of functionalities of a network communication protocol;
implementing, by the network device, a second set of functionalities of the network communication protocol;
receiving, from the host system, a single request for transmitting a packet sequence;
generating a transmit descriptor based on the request; and
creating, by the network device, individual packets from the packet sequence based on information in the transmit descriptor, wherein creating the individual packets is one functionality of the second set of functionalities of the network communication protocol.

10. The method of claim 9, comprising:
performing, by the network device, an invariant cyclic redundancy check (CRC) function, wherein performing the invariant CRC function is one functionality of the second set of functionalities of the network communication protocol.

11. A non-transitory machine readable medium comprising machine-executable instructions, which, when executed by a machine, cause a network device to perform the method of claim 10.

12. A non-transitory machine readable medium comprising machine-executable instructions, which, when executed by a machine, cause a network device to perform the method of claim 9.

13. A method comprising:
implementing, by a host system, a first set of functionalities of a network communication protocol;
communicating, by the host system, with a network device, the network device being operable to implement a second set of functionalities of the network communication protocol; and
transmitting, from the host system to the network device, a single request for transmitting a packet sequence,
wherein the network device generates a transmit descriptor based on the request,
wherein the network device creates individual packets from the packet sequence based on information in the transmit descriptor, wherein creating the individual packets is one functionality of the second set of functionalities of the network communication protocol.

14. The method of claim 13, comprising:
  sending, from the host system to the network device, a request for transmission of a packet,
  wherein the network device performs an invariant cyclic redundancy check (CRC) calculation and insertion function for the packet, wherein performing the invariant CRC calculation and insertion function is one functionality of the second set of functionalities of the network communication protocol.

15. The method of claim 13, comprising:
  receiving, by the host system, a receive descriptor including a validation result of an invariant cyclic redundancy check (CRC) validation,
  wherein the invariant CRC validation is performed by the network device for a packet received from a network, wherein performing the invariant CRC validation is one functionality of the second set of functionalities of the network communication protocol.

16. A non-transitory machine readable medium comprising machine-executable instructions, which, when executed by a machine, cause a network device to perform the method of claim 13.

* * * * *